(12) United States Patent
Morimoto (10) Patent No.: US 7,755,699 B2
(45) Date of Patent: Jul. 13, 2010

(54) DIGITAL CAMERA

(75) Inventor: Yasuhiro Morimoto, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 723 days.

(21) Appl. No.: 11/359,174

(22) Filed: Feb. 21, 2006

(65) Prior Publication Data

US 2006/0239653 A1  Oct. 26, 2006

(30) Foreign Application Priority Data

Apr. 22, 2005  (JP) .............................. 2005-124904

(51) Int. Cl.
*H04N 5/225* (2006.01)

(52) U.S. Cl. .................. 348/373; 396/535; D16/242

(58) Field of Classification Search ............ 348/333.06, 348/333.07, 373, 368; 396/299, 303, 12, 396/144, 493, 353, 294; 386/107, 312; D16/211, D16/215, 242, 243
See application file for complete search history.

(56) References Cited

U.S. PATENT DOCUMENTS

| 4,451,130 | A | * | 5/1984 | Yan .............................. 396/424 |
| 5,572,252 | A | * | 11/1996 | Naka et al. ............. 348/208.16 |
| 5,664,243 | A | * | 9/1997 | Okada et al. ................. 396/246 |
| 6,181,381 | B1 | * | 1/2001 | Evans ..................... 348/333.01 |
| 6,519,003 | B1 | * | 2/2003 | Swayze ........................ 348/375 |
| 6,591,069 | B2 | * | 7/2003 | Horiguchi ................... 396/429 |
| 6,873,367 | B1 | * | 3/2005 | Hirata et al. ................. 348/372 |
| 6,942,400 | B2 | * | 9/2005 | Shibayama .................. 396/419 |
| 6,980,735 | B2 | * | 12/2005 | Horiguchi ................... 396/429 |
| 7,133,608 | B1 | * | 11/2006 | Nagata et al. ............... 396/374 |
| 7,206,024 | B2 | * | 4/2007 | Tsukahara et al. .......... 348/373 |
| 7,215,371 | B2 | * | 5/2007 | Fellegara et al. ........ 348/333.13 |
| 7,295,240 | B2 | * | 11/2007 | Kobayashi et al. ..... 348/333.06 |
| 2003/0200626 | A1 | * | 10/2003 | Kosako et al. ................. 16/337 |
| 2004/0174452 | A1 | * | 9/2004 | Kinemura et al. ...... 348/333.06 |
| 2005/0174479 | A1 | * | 8/2005 | Kosako ....................... 348/376 |
| 2005/0253961 | A1 | * | 11/2005 | Nakamura et al. .......... 348/373 |
| 2005/0280732 | A1 | * | 12/2005 | Misawa ................ 348/333.06 |
| 2006/0098116 | A1 | * | 5/2006 | Manico et al. .............. 348/373 |

FOREIGN PATENT DOCUMENTS

| CN | 1231433 A | 10/1999 |
| JP | 2004-204950 A | 7/2004 |
| JP | 2004-266694 A | 9/2004 |
| JP | 2004-309740 A | 11/2004 |

* cited by examiner

*Primary Examiner*—Lin Ye
*Assistant Examiner*—Don Nguyen
(74) *Attorney, Agent, or Firm*—Drinker Biddle & Reath LLP (57) ABSTRACT

A small and slim digital camera with an improved grip and a large display unit is provided. The digital camera takes a picture of an object via a lens unit installed in a front surface of a case of the digital camera. The digital camera includes: a case that has a main body in which a lens unit is formed on a front surface of the main body; and a side portion of the case which is pivotably coupled to the main body to be able to pivot toward the lens unit with respect to the main body; and a manipulating unit which is exposed to the outside between the main body and the side portion at a rear surface of the case when the side portion is pivoted.

16 Claims, 6 Drawing Sheets

DIGITAL CAMERA

This application claims the priority of Japanese Patent Application No. 2005-124904, filed on Apr. 22, 2005 in the Japanese Patent Office, the disclosure of which is incorporated herein in its entirety by reference.

BACKGROUND OF THE INVENTION

1. Field of the Invention

The present invention relates to a digital camera wherein a user can take a picture of an object by looking at a screen of a display unit while holding the digital camera by hand.

2. Description of the Related Art

Recently, for users' convenience, smaller and slimmer digital cameras have been manufactured. Digital camera display units such as liquid crystal displays (LCDs), however, are required to be large to improve visibility of an image when determining a photograph range during photographing, or checking or processing a photographed image. Also, the size of a user grip of a miniaturized slim digital camera inevitably becomes small and, thus, the user cannot stably support the digital camera when photographing. Therefore, a small and slim digital camera with an improved grip is required.

Japanese Patent Laid-Open Publication No. 2004-309740 discloses a digital camera having a rotatable grip, of the same thickness as the main body of the digital camera, separately mounted on a side of the main body. Thus, the grip can protrude further outward than the main body by rotating the grip. As a result, a user can hold the grip, and take a photograph of an object while the digital camera is in a stable state. Also, the digital camera can be slim, since the grip can be disposed so that it does not protrude from the main body when not photographing. Although this digital camera provides an improved grip, a separate grip having the same thickness as the main body of the digital camera is required. Therefore, such a digital camera has an undesirable increased width.

Japanese Patent Laid-Open Publication No. 2004-266694 discloses a digital camera having a main body of the digital camera, a rotation axis formed at the rear of the main body and that coincides with an optical axis, and a display cabinet (display unit) that is rotatably coupled to the main body to be able to rotate with respect to the rotation axis. Thus, a user can rotate the display cabinet to place it in a location convenient for the user to see the display cabinet. In such a digital camera, the display cabinet can be rotated with respect to the main body of the digital camera and the main body protruding by the rotation of the display cabinet can be used as the grip. This digital camera, however, is not as stable as desired.

SUMMARY OF THE INVENTION

The present invention provides a small and slim digital camera with an improved grip and a large display unit.

According to an aspect of the present invention, there is provided a digital camera comprising a case including a main body in which a lens unit is formed on a front surface of the main body; a side portion of the case that is pivotably coupled to the main body to be able to pivot toward the lens unit with respect to the main body; and a manipulating unit that is exposed to the outside between the main body and the side portion at a rear surface of the case when the side portion is pivoted.

Because the side portion of the case is pivotable toward the lens unit, a user may pivot and hold the side portion during photographing, using the extended side portion as a grip. In addition, since the side portion is pivoted toward the lens unit, a contact area between the palm of the user holding the side portion and an outer surface of the side portion is greatly increased.

Moreover, the manipulating unit between the main body and the side portion is exposed to the outside at the rear surface of the case when the other side is pivoted. The manipulating unit can be accommodated in the case as the other side returns to its original location.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

The present invention will now be described more fully with reference to the accompanying drawings, in which exemplary embodiments of the invention are shown.

Figure 1:
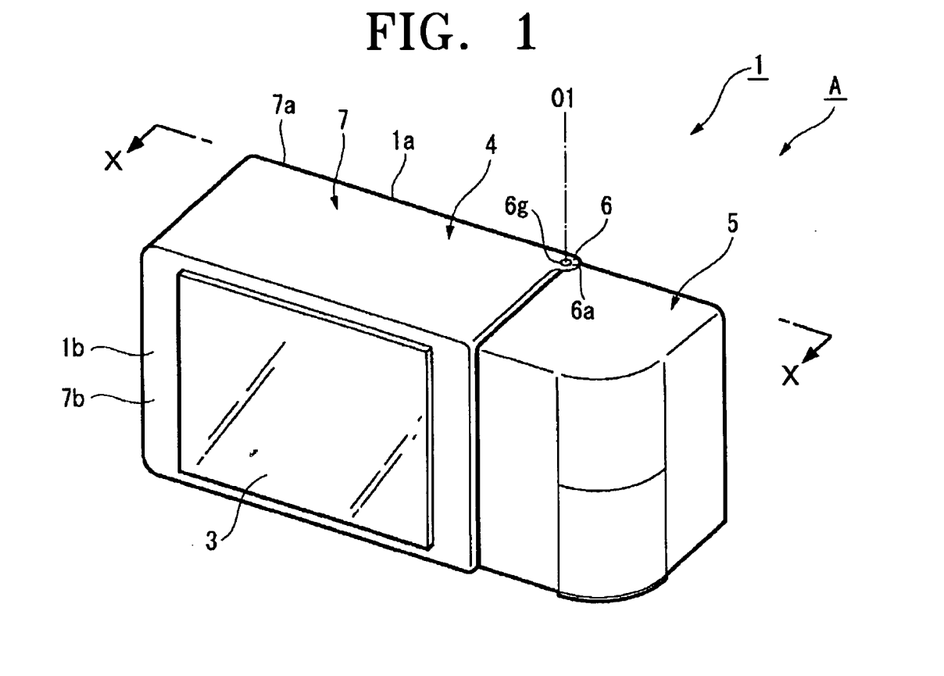
FIG. 1 is a perspective view of a digital camera according to an embodiment of the present invention.
Figure 2:
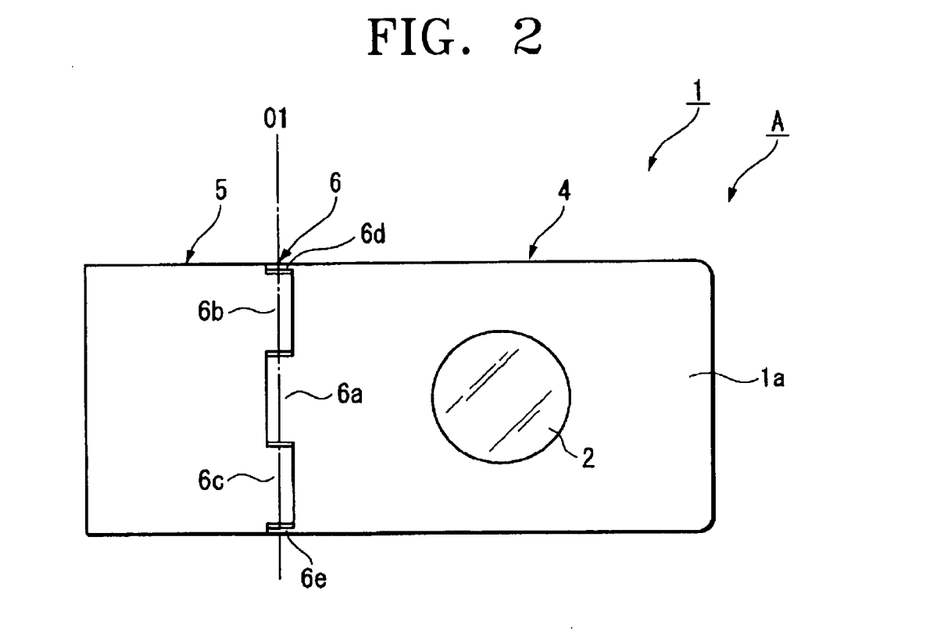
FIG. 2 is a view of the digital camera of FIG. 1 seen from the direction X-X.

Referring to FIGS. 1 and 2, a digital camera A according to an embodiment of the present invention includes a case 1, a lens unit 2, and a display unit 3. The display unit 3 can be, for example, a flat panel display (FPD). The case 1 is shaped substantially like a hexahedron and forms the exterior of the digital camera A. The lens unit 2 is installed in a front surface 1a of the case 1 to obtain an image of an object. The display unit 3 is installed in a rear surface 1b of the case 1.

Figure 3:
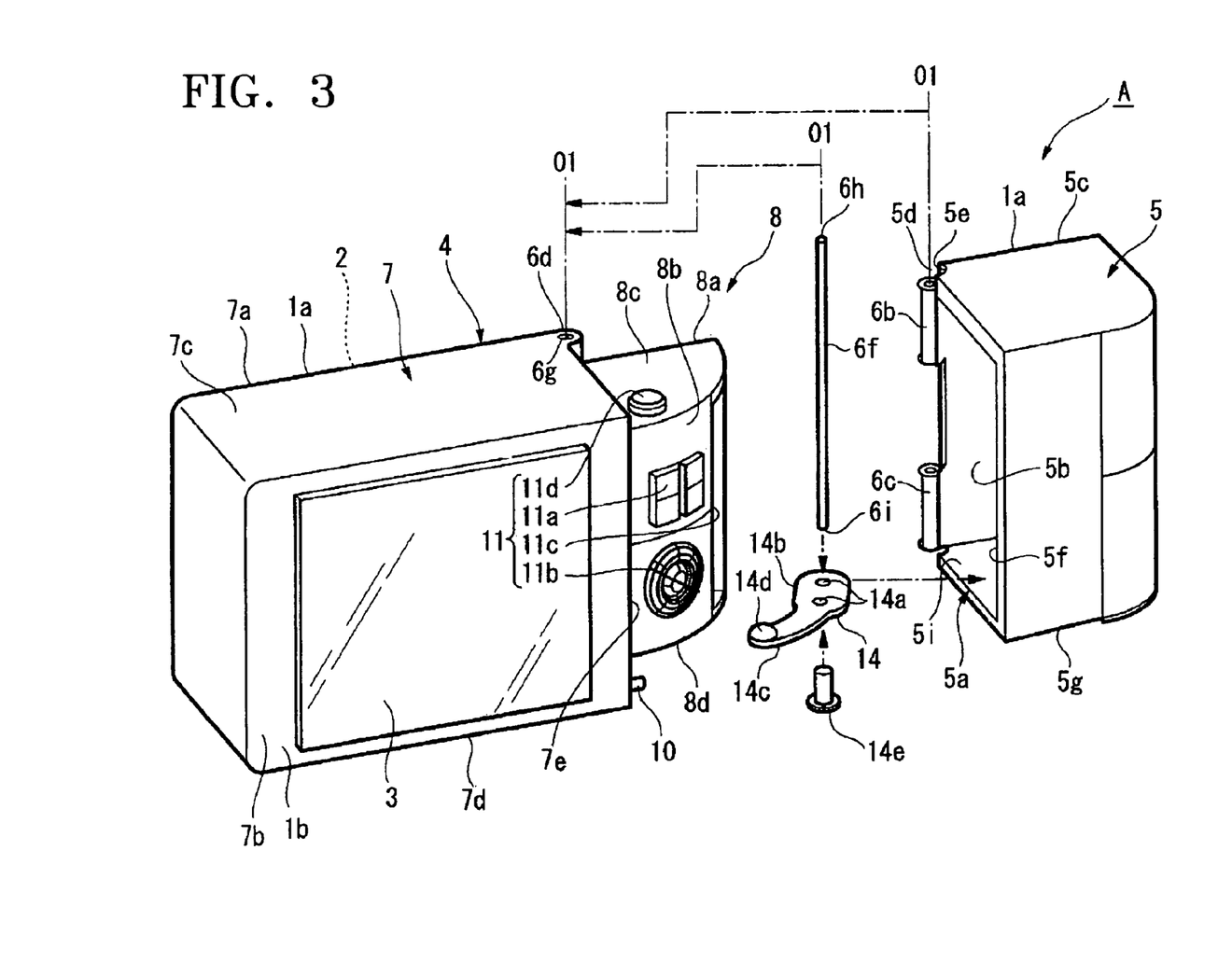
FIG. 3 is an exploded perspective view of the digital camera illustrated in FIG. 1.

Referring to FIGS. 1 thorough 3, the case 1 includes a first case unit 4, a second case unit (i.e., a side portion) 5, and a hinge unit 6. The second case unit 5 is installed at one side of the case 1. The hinge unit 6 is installed near the front surface 1a of the case 1 at the border between the first and second case units 4 and 5. The hinge unit 6 contacts the first case unit 4 so that the second case unit 5 can be pivoted.

As illustrated in FIG. 3, the first case unit 4 includes a main body 7, protrusion unit 8, the lens unit 2 installed in the front surface 7a of the main body 7, and the display unit 3 shaped in a rectangular flat panel and that is installed in a rear surface 7b of the main body 7. The main body 7 is formed substantially like a hexahedron. The protrusion unit 8 is formed on a side surface 7e of the main body 7 that is closer to the second case unit 5.

The protrusion unit 8 protrudes in a direction perpendicular to the side surface 7e of the main body 7 that is closer to the second case unit 5. A cross section of the protrusion unit 8 is shaped like a fan. The protrusion unit 8 includes a flat side surface 8a, a curved side surface 8b, and top and bottom surfaces 8c and 8d covering the top and bottom ends of the flat and curved side surfaces 8a and 8b. The flat side surface 8a is disposed close to the front surface 7a of the main body 7 along the direction in which the protrusion unit 8 extends. The curved side surface 8b, which connects the side surface 7e of the main body 7 and the flat side surface 8a, is curved like an arc with an axis 01 of the hinge unit 6 as its center.

The flat side surface 8a is disposed closer to the front surface 7a of the main body 7 than the rear surface 7b of the main body 7. A part of the curved side surface 8b contacting the side surface 7e of the main body 7 is disposed closer to the rear surface 7b of the main body than the front surface 7a of the main body 7. The top and bottom surfaces 8c and 8d are parallel to the top and bottom surfaces 7c and 7d of the main body 7. The top surface 8c of the protrusion unit 8 is disposed closer to the top surface 7c of the main body 7 than the bottom surface 7c of the main body, and the bottom surface 8d of the protrusion unit 8 is disposed closer to the bottom surface 7d of the main body 7 than the top surface 7c of the main body 7.

The second case unit 5, shaped substantially like a hexahedron, includes a side surface 5a that is close to the first case unit 4. An aperture 5b is formed in the side surface 5a. A groove 5e is formed in a corner 5d where the side surface 5a and a front surface 5c of the second case unit 5 meet. The cross section of the groove 5e is concave. The radius of the groove 5e is equal to the radius of first, second, and third cylindrical members 6a, 6b, and 6c of the hinge unit 6, which will be described later.

The hinge unit 6 includes two protruding pieces 6d and 6e, an axis rod 6f shaped like a cylindrical rod, and the three cylindrical elements 6a, 6b, and 6c, as illustrated in FIGS. 2 and 3. The protruding pieces 6d and 6e are perpendicularly formed on the side surface 7e of the main body 7 to protrude toward the second case unit 5. The protruding pieces 6d and 6e are flat and their outer circumferences are shaped like circular arcs, and communicating holes 6g are respectively formed in each of the protruding pieces 6d and 6e. The axis rode 6f passes through the protruding pieces 6d and 6e. The protruding pieces 6d and 6e are disposed near the front surface 7a of the main body 7, and parallelly extend respectively from the top and bottom surfaces 7c and 7d of the main body 7. The axis rod 6f is inserted into the first, second, and third cylindrical members 6a, 6b, and 6c, and is fixed when a top end 6h and a bottom end 6i of the axis rod 6f are respectively inserted into the protruding pieces 6d and 6e.

One of the cylindrical members (e.g., the first cylindrical member 6a) among the three cylindrical members 6a, 6b, and 6c is disposed roughly at the center of the height of the bottom surface 7d of the main body 7, and the outer circumferential surface of the one of the cylindrical members is integrated with the main body 7. The outer circumferential surfaces of the other two cylindrical members (e.g., the second and third cylindrical members 6b and 6c) are integrated with the groove 5e of the second case unit 5. The first and second case units 4 and 5 are connected by inserting the axis rod 6f into the first, second, and third cylindrical members 6a, 6b, and 6c. At the same time, the second cylindrical member 6b is disposed above the first cylindrical member 6a and the third cylindrical member 6c is disposed below the first cylindrical member 6a to support the second case unit 5.

In the above-described structure, the second case unit 5 can pivot with respect to the axis 01 of the hinge unit 6 (i.e., the axis of the axis rod 6f); that is, the second case unit 5 can be pivoted toward the lens unit 2 in the first case unit 4 since the hinge unit 6 is disposed near the front surface 1a of the case 1. When the second case unit 5 is not pivoted, the side surface 5a of the second case unit 5 in which the aperture 5b is formed contacts the side surface 7e of the main body 7 near the second case unit 5 so that the second case unit 5 is aligned with the main body 7 of the first case unit 4. The protrusion unit 8 can be accommodated in the aperture 5b of the second case unit 5 because the width and height of the protrusion unit 8 is slightly smaller than the width and height of the main body 7. When the second case unit 5 is pivoted, an end 5f of the side surface 5a of the second case unit 5 facing the hinge unit 6 pivots with respect to the axis 01 of the hinge unit 6, and thus the second case unit 5 is pivoted in a circular line without contacting the curved side surface 8b of the protrusion unit 8.

A cylindrical power supply button 10 that can be pushed in a direction perpendicular to the side surface 7e is formed on the side surface 7a of the main body 7 near the second case unit 5. The power supply button 10 acts as a detecting element 13 (see FIG. 6) that detects whether the second case unit 5 is pivoted. The detecting element 13 detects that the power supply button 10 is pushed into the main body 7 and transmits a signal to a switching element 15 (see FIG. 6), which will be described later, based on the detected results to turn off a power supply unit of the digital camera A. Conversely, when the power supply button 10 is protruded from the side surface 7e, the detecting element 13 detects the power supplying button 10 protruding outward and transmits a signal to the switching element 15 to turn on the power supply unit. Therefore, the power supply button 10 can turn on or off the power supply unit.

A manipulating unit 11 is provided at the protrusion unit 8. The manipulating unit 11 includes zoom buttons 11a, setting buttons 11b, and a recording medium inserting unit 11c in which a rectangular aperture is formed. The zoom buttons 11a used during photographing and the setting buttons 11b for setting various settings are disposed near the main body 7 on the curved side surface 8b. The recording medium inserting unit 11c for installing a recording medium therein is formed in the curved side surface 8b near the flat side surface 8a.

The manipulating unit 11 also includes a shutter release button 11d formed on top of the top surface 8c of the protrusion unit 8 and a groove 12 (see FIGS. 4 and 5) formed on the bottom surface 8d of the protrusion unit 8. The shutter release button 11d protrudes in a direction perpendicular to the top surface 8c. The groove 12 is made along the circumference of the curved side surface 8b, and first, second, and third hemispherical indents 12a, 12b, and 12c are lined in the groove 12 at fixed intervals. The first, second, and third hemispherical indents 12a, 12b, and 12c are sequentially lined from near the first case unit 4 to the second case unit 5. The second and third hemispherical indents 12b and 12c act as the detecting element 13 that detects to which step the second case unit 5 is pivoted. When a hemispherical protrusion 14d is coupled to one of the first, second, and third hemispherical indents 12a, 12b, and 12c, an electrical signal, for example, is generated and, based on the detection results of the electrical signal, a signal is transmitted to the switching element 15 to turn on or off the system power of the digital camera A.

Figure 4:
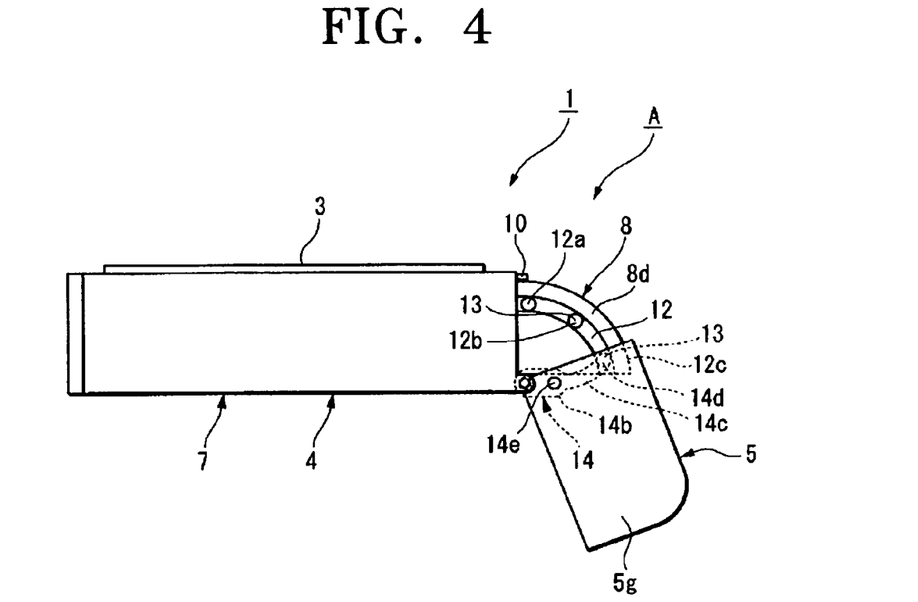
FIG. 4 is a bottom view of the digital camera illustrated in FIG. 1 illustrating how a groove, a hemisphere, and a protrusion of the digital camera are coupled according to an embodiment of the present invention.
Figure 5:
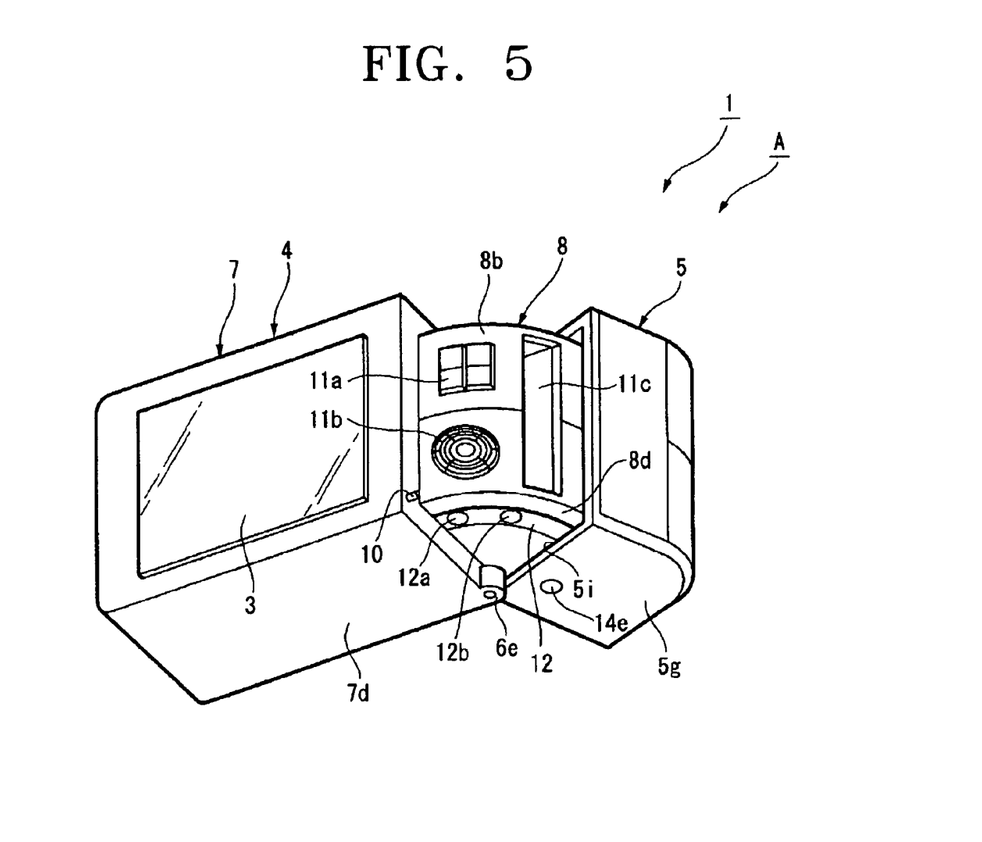
FIG. 5 is a perspective view of the digital camera of FIG. 1 when a second case unit is pivoted according to an embodiment of the present invention.

As illustrated in FIGS. 3 through 5, a plate element 14 is fixed on a top surface 5i of a bottom surface 5g of the second case unit 5. The plate element 14 includes an oval shaped portion 14b in which two holes 17e are formed, and a protruded portion 14c, which extends from a circular circumference of the oval shaped portion 14b.

The hemispherical protrusion 14d protruding in a direction perpendicular to a top surface of the protruded portion 14c is formed on top of an end of the protruded portion 14c that is further away from the oval shaped portion 14b. The plate element 14 is fixed to the bottom surface 5g of the second case unit 5 via a pin 14e inserted into one of the holes 14a. The other hole 14a is disposed in line with the third cylindrical member 6c of the hinge unit 6 and the protruding piece 6e that extends in parallel from the bottom surface 7d of the main body 7, and the axis rod 6f is inserted in the hole 17e. The hemispherical protrusion 14d is disposed above the top surface 5i of the bottom surface 5g. Thus, when the first case unit 4 and the second case unit 5 are coupled to each other via the hinge unit 6, the hemispherical protrusion 14d is coupled to the groove 12 formed in the bottom surface 8d of the protrusion unit 8 of the first case unit 4.

Figure 6:
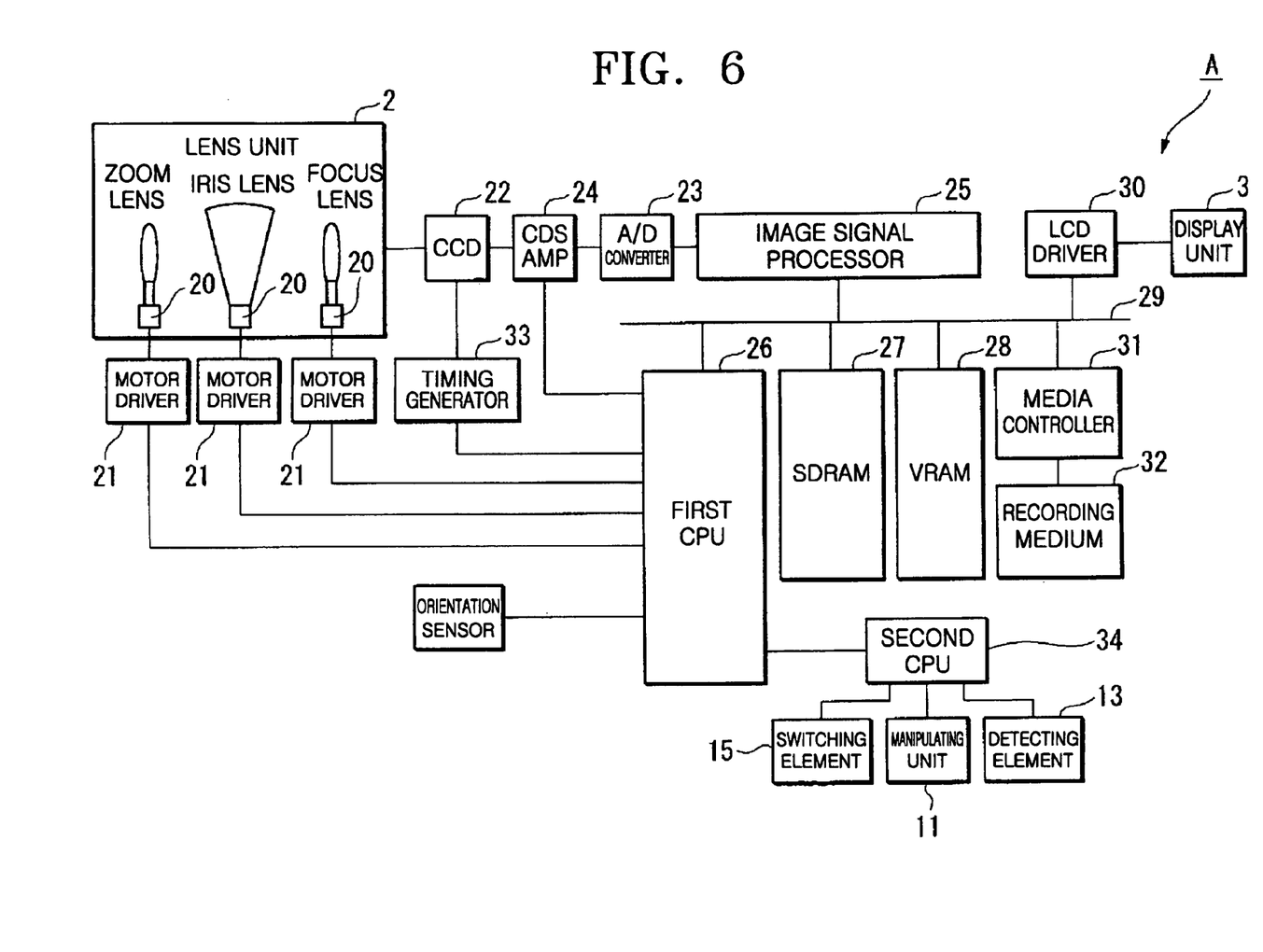
FIG. 6 is a block diagram of the digital camera illustrated in FIG. 1.

Referring to FIG. 6, in the digital camera A according to the present embodiment, the lens unit 2 includes a zoom lens for controlling magnification of an object, an iris for controlling the size of an aperture control, and a focus lens for controlling focus of the object. Motors 20, which respectively control the zoom lens, the iris, and the focus lens, are connected to motor drivers 21 inside the first case unit 4 to perform focus, aperture, and magnification adjustments of the digital camera A.

A charged coupled device (CCD) 22, which focuses an image of the object obtained, is connected to the lens unit. The CCD 22 is connected to an analog-to-digital (A/D) converter 23 via a correlated double sampling (CDS) amplifier AMP 24. The A/D converter 23 converts an analog signal of the obtained image into a digital signal, and the CDS-AMP 24 removes noise included in the analog signal output from the CCD 22; then amplifies the analog signal. The A/D converter 23 is connected to an image signal processor 25. The image signal processor 25 receives the digital signal of the image from the A/D converter 23, performs color temperature compensation, gamma compensation, edge enhancement, etc., on the image, converts a resolution of image data into a preset resolution, and compresses and encodes the image data.

The image signal processor 25 is connected to a first central processing unit (CPU) 26, a synchronous dynamic random access memory (SDRAM) 27, and a video random access memory (VRAM) 28 via a bus line 29 in a motherboard. The display unit 3 is also connected to the bus line 29 via a liquid crystal display (LCD) driver 30, and a recording medium 23 is connected to the bus line 29 via a media controller 31.

The first CPU 26 is connected to each of the motor drivers 21, a timing generator 33, and the CDS-AMP 24. The first CPU 26 controls each of the motor drivers 21, the timing generator 33, and the CDS-AMP 24 based on, for example, various processes performed by the image signal processor 25. The timing generator 33 is connected to the CCD 22 to generate various horizontal or vertical driving signals to drive the CCD 22 or signals used in analog front processing in synchronization with a reference clock.

A second CPU 34 is connected to the first CPU 26. The detecting element 13 of the power supply button 10 or the hemispherical indents 12b and 12c, the switching element 15, and the manipulating unit 11 provided in the protrusion unit 8 illustrated in FIGS. 3 through 5 are connected to the second CPU 34. The second CPU 34 receives an output signal from the manipulating unit 11 to control various operations together with the first CPU 26. Also, the second CPU 34 receives an output signal from the detecting element 13 to control switching of the power supply unit of the digital camera A from on to off or vice versa.

The operation and effects of the digital camera A constructed as above will now be described.

First, when the digital camera A does not perform photographing, the side surface 7e of the main body 7 near the second case unit 5 and the side surface 5a of the second case unit 5 in which the aperture 5b is formed contact each other, as illustrated in FIGS. 1 through 3. In the present state, the protrusion unit 8 on which the manipulating unit 11 is formed is accommodated in the second case unit 5. As a result, the digital camera A can be maintained in a small and slim state. The side surface 5a of the second case unit 5 pushes the power supply button 10 formed on the side surface 7e of the main body 7 into the first case unit 4 and, thus, the power supply unit of the digital camera A is turned off. Also, in the present state, the hemispherical protrusion 14d of the plate element 14 installed in the second case unit 5 is inserted into the first hemispherical indent 12a.

Figure 7:
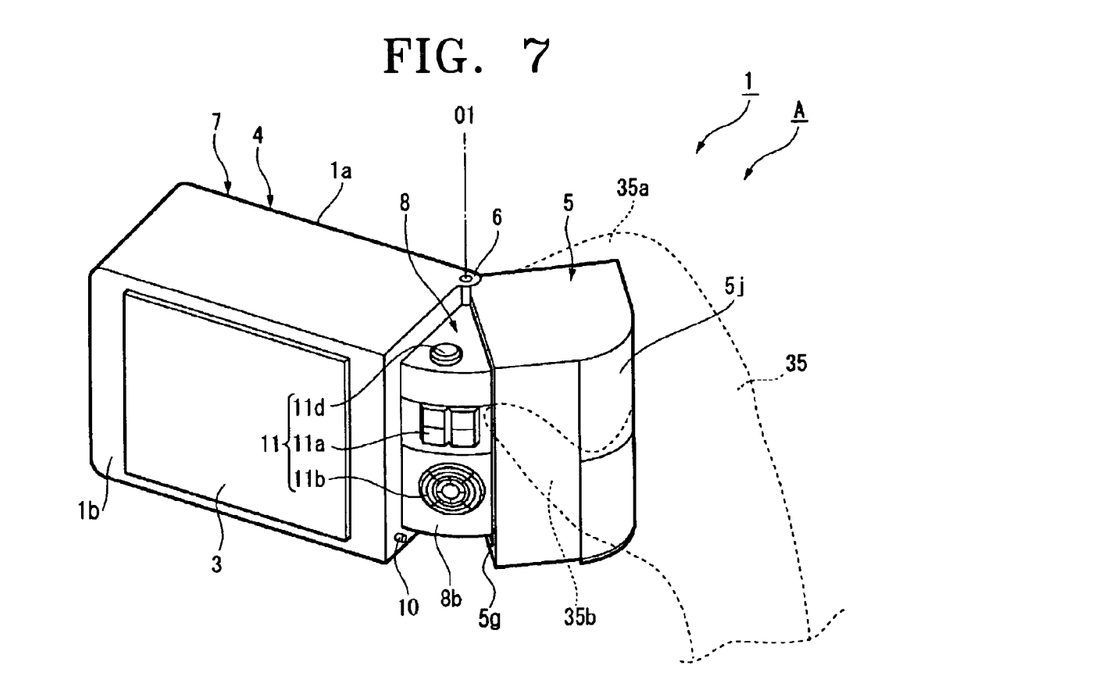
FIG. 7 is a perspective view of the digital camera of FIG. 1 when the second case unit is pivoted to a first step according to an embodiment of the present invention.
Figure 8:
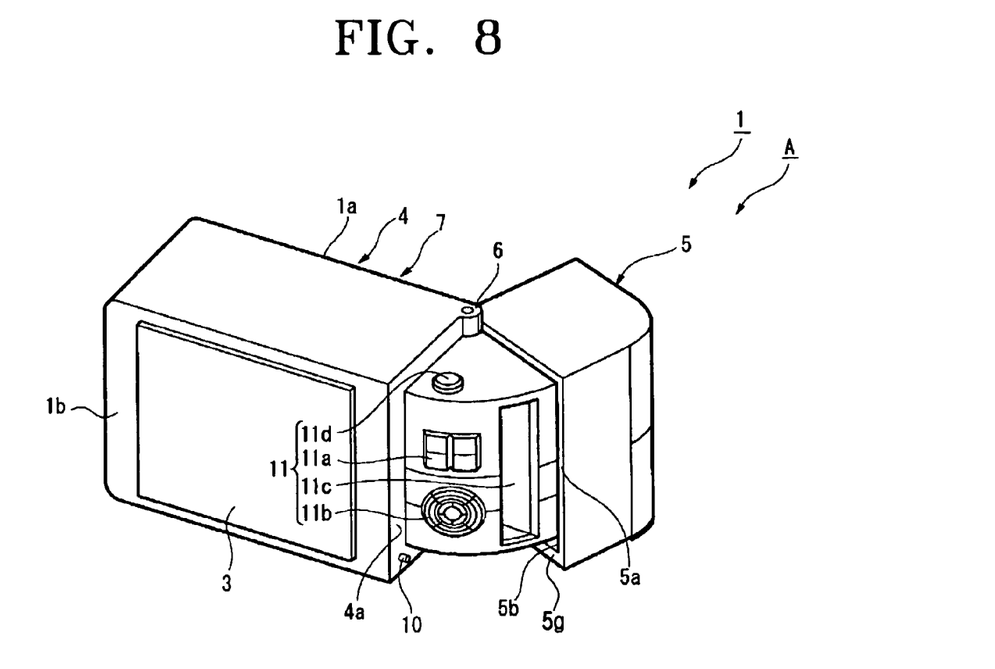
FIG. 8 is a perspective view of the digital camera of FIG. 1 when the second case unit is pivoted to a second step according to an embodiment of the present invention.

When the user uses the digital camera A to take a picture of an object, the user holds the digital camera A by the second case unit 5 with his or her hand 35 and pivots the second case unit 5 with respect to the axis 01 of the hinge unit 6, as illustrated in FIG. 7. By pivoting the second case unit 5, the hemispherical protrusion 14d of the plate element 14 is released from the first hemispherical indent 17e and moves along the groove 12 so that the second case unit 5 moves toward the lens unit 2. As the second case unit 5 is pivoted, the side surface 5a of the second case unit 5 simultaneously moves away from the side surface 7e of the main body 7. As a result, the power supply button 10 is no longer pushed into the first case unit 4, and an output signal regarding the current release of the power supply button 10 is transmitted to the second CPU 34. Thereafter, the second CPU 34 transmits a signal to the switching element 15 to turn on the power supply unit of the digital camera A. When the hemispherical protrusion 14d, which moves along the groove 12 by the pivoting operation of the second case unit 5, is inserted into the second hemispherical indent 12b, the first step of the pivoting operation of the second case unit 5 is completed.

In the present embodiment, the shutter release button 11d, the zoom buttons 11a, and the setting buttons 11b of the manipulating unit 11 disposed on the curved side surface 8b of the protrusion unit 8, which are required for photography an image, are exposed to the outside between the main body 7 of the first case unit 4 and the second case unit 5 at the rear surface 1b of the case 1, as illustrated in FIG. 7.

The user takes a photograph of an object by directing the front surface 1a of the case 1 toward the object while holding the digital camera A by the second case unit 5 pivoted toward the lens unit 2 with his or her hand 35. Since the second case unit 5 is pivoted toward the lens unit 2, the user touches a larger area of an outer surface 5j of the second case unit 5. Also, the user can operate the manipulating unit 11, such as the shutter button 11d, the zoom buttons 11a, or the setting buttons 11b, using his or her index finger 35a or thumb 35b while holding the digital camera A by the second case unit 5.

As illustrated in FIG. 6, a signal output when the user manipulates, for example, the shutter release button 11d is transmitted to the second CPU 34, and the second CPU 34 transmits an operating order to the motor 20 via the first CPU 26 and the motor driver 21. Accordingly, the magnification, focus, or aperture adjustment is performed, then an image of the object is obtained. The image of the object is focused in the CCD 22, and an analog signal of the focused image is converted into a digital signal via the A/D converter 23 and transmitted to the image signal processor 25. The image signal processor 25 performs various processes and transmits the digital signal to the display unit 3 via the LCD driver 30 to display an image on the display unit 3. User confirms the image displayed and memorizes the displayed image to a recording medium 32 via a media controller 31.

When the second case unit 5 is pivoted further toward the lens unit 2 as illustrated in FIGS. 3 through 6, the hemispherical protrusion 14d inserted into the second hemispherical indent 12b is released as the second case unit 5 is pivoted and moves along the groove to be inserted into the third hemispherical indent 12c. In the current state, the second step of the pivoting operation of the second case unit 5 is completed.

In the present embodiment, the recording medium inserting unit 11c is exposed to the outside as the second case unit 5 is pivoted from the first step to the second step. The power supply unit of the digital camera A should be off when the recording medium 32 is inserted in or removed from the recording medium inserting unit 11c. Therefore, when the semis spherical protrusion 14d is inserted into the third hemispherical indent 12c, the detecting element 13 outputs a signal to the second CPU 34. Thereafter, the second CPU 34 transmits a command to the switching element 15 to turn off the power supply unit of the digital camera A. Thus, the power supply unit of the digital camera A is automatically turned off when the user pivots the second case unit 5 to the second step to insert or remove the recording medium 32 to or from the recording medium inserting unit 11c.

When the second case unit 5 is pivoted from the second step to the first step, the detecting element 13 detects the hemispherical protrusion 14d inserted into the second hemispherical indent 12b and, consequently, the power supply unit of the digital camera A is turned on. Also, as the second case unit 5 is pivoted from the first step to a state in which the side surface 5a of the second case unit 5 contacts the side surface 7e of the main body 7, the power supply button 10 is once again pushed into the first case unit 4, thereby turning off the power supply unit of the digital camera A.

Therefore, in the digital camera A constructed as above, because the second case unit 5 can be pivoted toward the lens unit 2 with respect to the axis 01 of the hinge unit 6, the second case unit 5 can be used to hold the digital camera A when photographing an object and, at the same time, greatly increase the contact area between the palm of the user holding the second case unit 2 and the outer surface of the second case unit 5. As a result, the digital camera A can be stably supported while photographing an object.

When the second case unit 5 is not pivoted, the second case unit 5 is aligned with the case 1 of the digital camera A. The protrusion unit 8 in which the manipulating unit 11 is formed is accommodated inside the second case unit 5 and, thus, the digital camera A is maintained in a small and slim state.

The components of the manipulating unit 11 can be sequentially exposed to the outside as the second case unit 5 pivots from the first step to the second step and the exposure range of the manipulating unit can be determined depending on the pivoting step. As a result, at least a portion of the manipulating unit 11 does not need to be formed on an outer surface of the case 1 and exposed to the outside and, thus, the area occupied by the operating unit 11 on the outer surface of the case 1 can be decreased. Consequently, the size of the display unit can be increased.

As the second case unit 5 is pivoted, the power supply unit of the digital camera A is simultaneously automatically turned on or off by the power supply button 10. In addition, since the power supply unit of the digital camera A can be automatically turned on or off depending on the step to which the second case unit 5 is pivoted, the convenience of using the digital camera A increases.

While the present invention has been particularly shown and described with reference to exemplary embodiments thereof, it will be understood by those of ordinary skill in the art that various changes in form and detail may be made therein without departing from the spirit and scope of the present invention as defined by the following claims. For example, although the second case unit 5 is pivoted to two steps in the embodiment described above, the second case unit 5 can be pivoted to more than two steps. Also, the pivoting operation of the second case unit 5 can be pivoted without going through a special step, and when the second case unit 5 is pivoted in multiple steps, the second case unit 5 need not be structured to include the groove 12 and the hemispherical protrusion 14d that is inserted into the first through third hemispherical indents 12a through 12c arranged in a single line in the groove 12.

Figure 9:
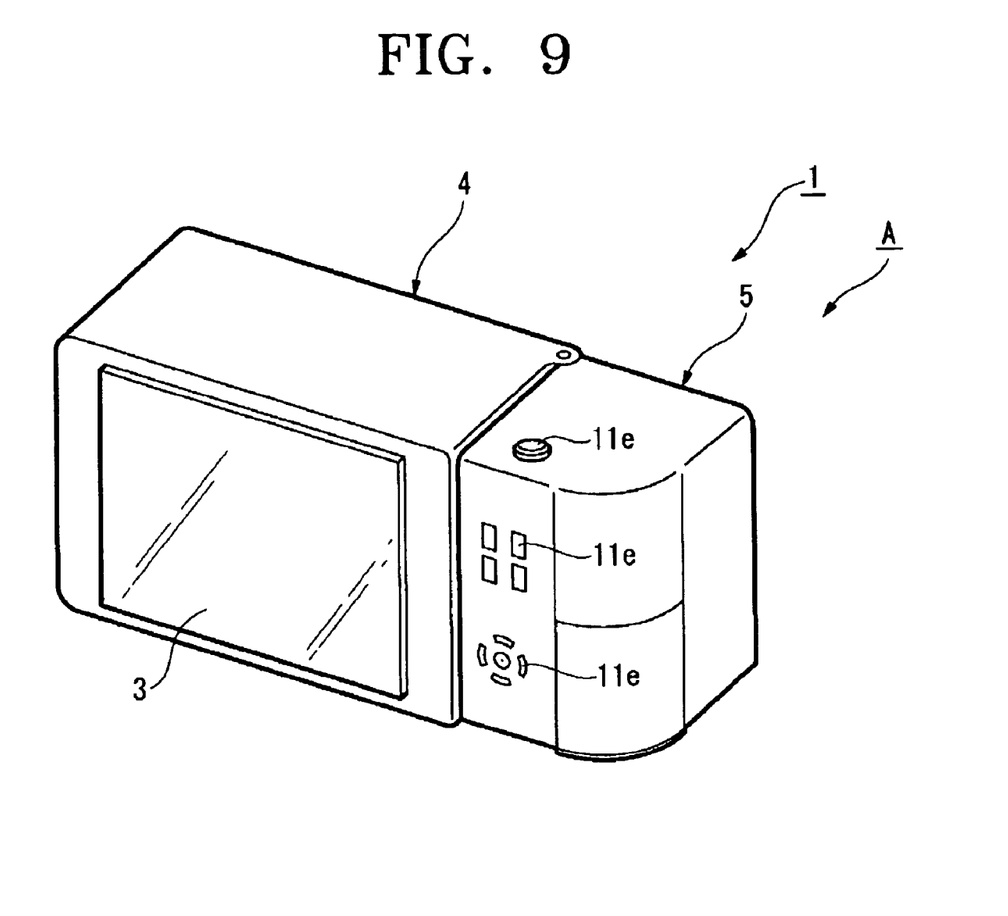
FIG. 9 is a perspective view of a modification of the digital camera depicted in FIG. 1, according to an embodiment of the present invention.

Also, in the embodiments of the present invention described above, the components of the manipulating unit 11 used for photographing an object are exposed to the outside when the second case unit 5 is pivoted to the first step and the recording medium inserting unit 11c in or from which the recording medium 32 is inserted or removed is exposed to the outside when the second case unit 5 is pivoted to the second step. The types or number of components of the manipulating unit 11 that are exposed to the outside as the second case unit 5 is pivoted, however, need not be limited to the above description. Also, in the digital camera A, other manipulating elements that are always exposed to the outside in addition to, the ones that are exposed to the outside by the pivoting operation of the second case unit 5, may be installed on the first case unit 4 or the second case unit 4. Related to this, referring to FIG. 9, buttons 11e exposed to the outside are formed on the outer surface of the second case unit 5 to perform various operations of the digital camera A by pressing them while the side surface 5a of the second case unit 5 and the sides surface 7e of the main body 7 contact each other. For example, the power supply unit of the digital camera A can be turned on or off, an image that was photographed can be displayed on the display unit 3, or the displayed image can be processed. The display unit 3 or a light-emitting element such as a light-emitting diode (LED) for checking access of the recording medium 32 may be exposed to the outside by the pivoting operation of the second case unit 5, in addition to the manipulating unit 11. In this case, as the display unit 3 or the light-emitting element is exposed to the outside, an image can be simultaneously displayed on the display unit 3 or the light-emitting element may be lit.

Regarding the structure of the digital camera A in which the power supply unit is automatically turned on or off depending on the step to which the second case unit 5 is pivoted, the detecting element 13 need not be limited to the power supply button 10 and the first, second, and third hemispherical indents 12a, 12b, and 12c. For example, a sensor that senses the pivoted angle of the second case unit 5 may be installed in the digital camera A to detect the pivoted angle of the second case unit 5 and turn the power supply unit on or off by the switching element 15 based on the sensed result.

According to the embodiments of the present invention described above, the image of the object obtained using the digital camera A is a still image. The image, however, may also be a moving picture.

According to the digital camera of the present invention, a side portion of the case that is pivoted when photographing an object can be used as a grip. Also, since the side portion of the case is pivoted toward a lens unit, a contact area between a palm of a user and an outer surface of the side portion of the case is increased and, thus, the digital camera can be stably supported when photographing the object.

In addition, a manipulating unit is exposed to the outside by the pivoting operation of the side portion of the case and the manipulating unit is accommodated inside the side portion of the case by pivoting the side portion of the case backward. As a result, an area occupied by the manipulating unit that is formed on an outer surface of the case is reduced and, thus, the digital camera can be maintained in a small and slim state. Further, the size of the display unit can be increased.

What is claimed is:

1. A digital camera comprising:
   a main body in which a lens unit is formed on a front surface of the main body; and
   a side portion of the case which is pivotably coupled to the main body and pivots in at least one pivot step between a fully extended position and a retracted position with respect to the main body;
   a manipulating unit that is user-operable for controlling camera functions which is exposed to the outside between the main body and the side portion only when the side portion is pivoted, an exposure portion of the manipulating unit being determined depending on the pivot step to which the side portion is pivoted;
   a detecting element which detects the pivot step to which the side portion is pivoted; and
   a switching element which turns on or off system power of the digital camera based on the detected results of the detecting element.

2. The digital camera of claim 1 where the manipulating unit includes at least one manipulating element selected from the group consisting of a shutter release button, zoom buttons, and setting buttons.

3. The digital camera of claim 1 where the manipulating unit further comprises a recording medium insertion unit.

4. The digital camera of claim 1 wherein the manipulating unit comprises at least one manipulating element which is exposed when the side portion is partially extended.

5. The digital camera of claim 1 wherein the manipulating unit comprises a recording medium insertion unit which is exposed when the side portion is fully extended.

6. The digital camera of claim 5 wherein the switching element turns off system power of the digital camera when the recording medium insertion unit is exposed.

7. The digital camera of claim 1 where the side portion pivots toward the front of the main body, and manipulating unit is exposed toward the back of the main body when the side portion is extended.

8. The digital camera of claim 1 where the side portion pivots toward the back of the main body, and the manipulating unit is exposed toward the front of the main body when the side portion is extended.

9. The digital camera of claim 1, wherein the side portion of the case is further operable for controlling camera functions.

10. A method of operating a digital camera comprising a main body with a front side and a back side; a side portion which is pivotably coupled to the main body; and a manipulating unit that is user-operable for controlling camera functions disposed within at least a portion of the main body or the side portion, wherein the manipulating unit has a plurality of manipulating elements, said method comprising the steps:
    pivoting the side portion in at least one pivot step between:
      (1) a retracted position where the manipulating unit is completely enclosed within at least a portion of the main body or the side portion, and
      (2) a fully extended position where all manipulating elements are exposed between the side portion and the main body;
    detecting the pivot step to which the side portion is pivoted; and
    turning on or off system power of the digital camera based on the detected results of the detecting.

11. The method of claim 10 wherein the manipulating unit further comprises a recording medium insertion unit which is exposed when the side portion is in fully extended position.

12. The method of claim 11 wherein system power of the digital camera is turned off when the recording medium insertion unit is exposed.

13. The method of claim 10 further comprising supplying power to the manipulating unit when at least a portion of the manipulating unit is exposed.

14. The method of claim 10 wherein system power of the digital camera is turned on when the side portion is not in the retracted position.

15. The method of claim 10 where the side portion pivots toward the front of the main body to expose at least a portion of the manipulating unit toward the back of the main body.

16. The method of claim 15 where the side portion pivots toward the back of the main body to expose at least a portion of the manipulating unit toward the front of the main body.

* * * * *